W. PRICE.
Rotary Cultivator.
No. 11,008.
Patented June 6, 1854.
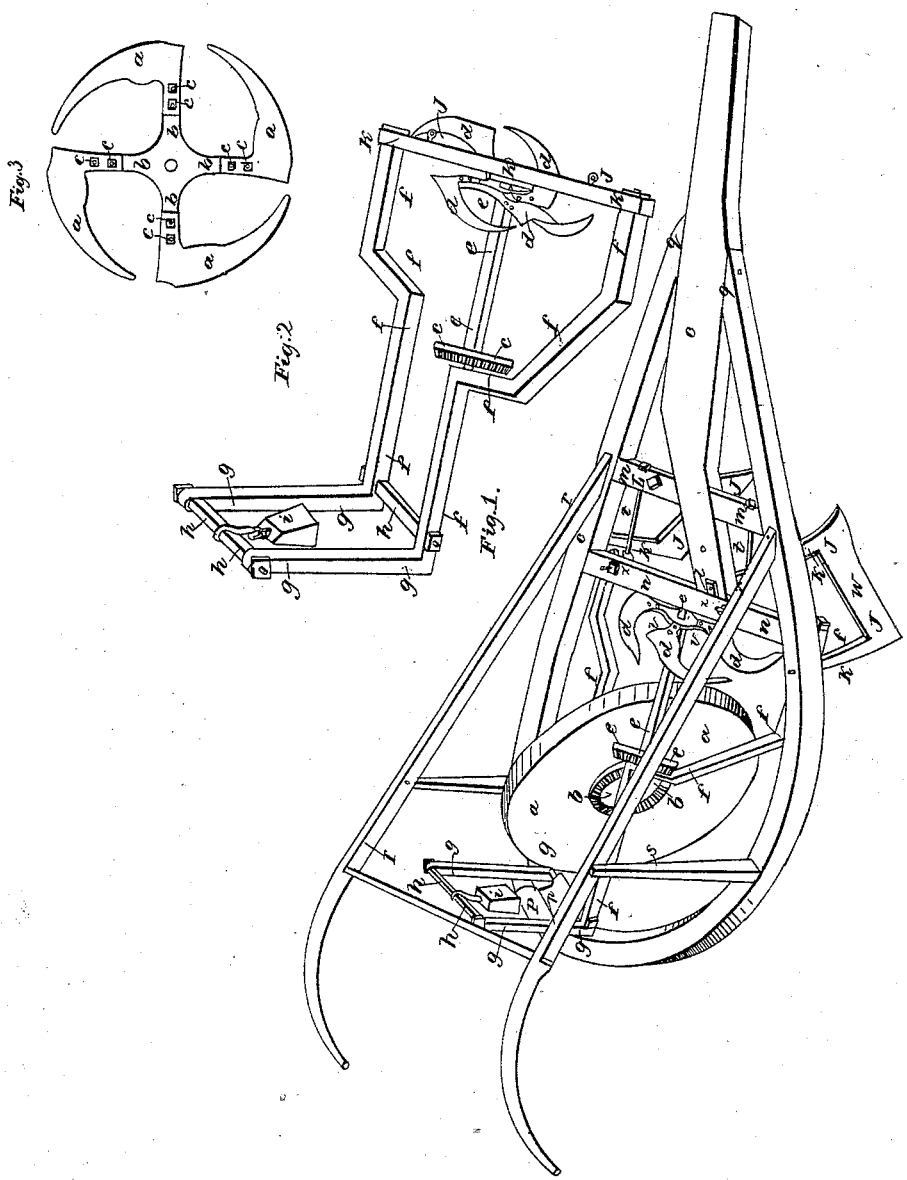

UNITED STATES PATENT OFFICE.

WHITMAN PRICE, OF GOLDSBOROUGH, NORTH CAROLINA.

IMPROVEMENT IN CULTIVATORS.

Specification forming part of Letters Patent No. 11,008, dated June 6, 1854.

*To all whom it may concern:*

Be it known that I, WHITMAN PRICE, of Goldsborough, in the county of Wayne and State of North Carolina, have invented and made certain new and useful Improvements on the Cotton Cultivator and Thinner; and I do hereby declare that the following is a full, clear, and exact description of the method of construction and mode of operating the same, reference being had to the accompanying drawings, and making a part of this specification, in which—

Figure 1 is a perspective view of the cultivator and thinner complete, generally of the simple form of construction represented.

$a\ a$ represent the driving guide-wheel, having a bevel-gearing, $b\ b$. $c\ c$ is a bevel-pinion. $d\ d\ d\ d$, are oblique twisted cutters or thinning-blades; $e\ e\ e$, the shaft of the blades; $f f f f f$, the center frame or cutter-support; $g\ g\ g\ g$, uprights; $h\ h\ h\ h$, cross-rails or suspension-beams; $i$, the weight; $J\ J\ J\ J$, the cultivators or shares; $k\ k\ k$, the double shanks of the shares; L L, screw-nuts of ends of shanks; $m\ m\ n\ n$, cross-ties or frame-rails; $o\ o$, the draft-beam. $p\ p$ is a strap or accommodating hold-up; $r\ r\ r\ r$, the handle-rails; $s\ s$, standard-uprights; $t\ t$, connection-rod; $v\ v$, the arms of the cutters; $x\ x$, screw-nuts to the staple-bolts.

Fig. 2 shows the revolving blades or thinners $d\ d\ d\ d$, attached to shaft $e\ e\ e$, working in the support-frame $f f f f f$, the uprights $g\ g\ g\ g$; $h\ h\ h\ h$, the cross-beams or frame-rails; $i$, the weight; J J, connecting eye-staples; $k\ k\ k$, the yoke-beam connecting the frame $f f f f$.

Fig. 3 is a front view of the revolving blades or thinners $a\ a\ a\ a$, attached to the arms $b\ b\ b\ b$ by nuts $c\ c\ c\ c$.

To enable others to be skilled in the use and application of my invention and improvements, I will proceed to describe the construction and operation thereof, the nature and principles of which consist in constructing a cotton cultivator and thinner combined in the form represented by Fig. 1, which I deem the simplest and cheapest in design, the whole cost of which for the usual size of implement is not over fifteen dollars.

A longitudinal strip or piece of suitable timber is shaped, and, being bent in the form shown by Fig. 1, is confined or braced together near the ends by the cross-ties or connecting-rails $m\ m\ n\ n$, together with the draft-beam $o\ o$, extending back to and its butt-end inserted into the cross-rail $n\ n$, the ends $q\ q$ being bolted to the beam $o\ o$ by bolts and screws. Attached to this framing is the handle-rails $r\ r\ r\ r$, supported by standard-uprights $s\ s$. Having this work complete, a driving guide-wheel, $a\ a\ a$, of wood or metal, and of suitable size and weight, is made, having a bevel-gear wheel, $b\ b$, attached thereto. This wheel has an axle, its ends working in bearings or sockets formed in the center framing, $f f f f$, which is constructed of metal in the form represented by Fig. 2, having the ends bent to answer as uprights $g\ g\ g\ g$, braced together by cross-rails $h\ h\ h$ and screw-nuts or taps on the ends thereof. The front ends of this framing are connected to a yoke-brace rail, $k\ k\ k$, Fig. 2, having eye-staples $j\ j$ for attachment or stay rods $t\ t$, passing from the cross-tie or rail $m\ m$. This yoke-brace is connected with the bolts $x\ x$, inserted through the cross-rail $n\ n$, Fig. 1. Next is constructed a shaft, $e\ e\ e$, to which are connected arms $v\ v$, to which are attached, by bolts and screw-taps or otherwise, the twisted cutter-blades or thinners $d\ d\ d\ d$, Fig. 1, and shown in full in Fig. 3. To the other end of the horisontal shaft $e\ e\ e$ is attached a bevel-pinion wheel, $c\ c$, which meshes or works into the gear-wheel $b\ b$. Next is the construction of right and left hand cultivator-shares J J, having two shanks, $k\ k\ k$, the shanks of the right hand one, J W J, passing through the draft-beam and the cultivator-frame, the shank of the left-hand cultivator-share passing through the framing and the cross-rail $m\ m$.

At the letters $p\ p$ is a strap or other suitable device attached to the cultivator framework and the lower cross-tie, $h$, and is designed to be used as an accommodating support, so as to admit of the framing $f f f f$ to play or give sufficiently up and down should the driving-wheel $a\ a$ pass over any obstruction, and which might otherwise tend to jostle or cause a sudden concussion of the machine in encountering any obstacle.

The implement is superintended by one person, and is drawn by one horse attached in the usual way of attaching to plows.

Having described and delineated the construction of my improved combined cotton cultivator and thinner, I hereunto give the operation or application thereof, omitting, however, the detail of the mode of cotton-planting, as it is too well known to be deemed essential herewith.

The design of my implement is as follows: After the cotton has been planted in drills or furrows, and has germinated and attained the growth of about three or four inches above the surface of the soil, the cultivator is resorted to. The operator or attendant, standing in the rear of the implement, as in plowing, the operation commences by driving the horse to the left of the cotton-row, so as to avoid the tramping or breaking down of the cotton-plants. The draft of the machine is in a direct line from the end of the beam $o\ o$ with the circumference of the wheel $a\ a$, which is to the left of the furrow or row of plants. The revolving thinners and shaft thereof pass along the top and center of the row of plants. It will be perceived that as the machine advances forward, the cultivator or left-hand share, J J, being placed in advance, cultivates or turns up and loosens the soil on the left side of the row, while the right-hand share, J W J, performs the same duties on the right side of the furrow. Should the left-hand share meet with any obstacle and fail to throw it off the furrow, the right-hand share will act more effectually. The left-hand share is placed about six inches in advance of the right-hand one, and the object of placing the left-hand share in advance of the right-hand one is to afford the driver or operator a ready view of the row of plants and to mark the direct line of draft, the point of the left-hand share being in a line with the driving-wheel $a\ a$, Fig. 1. As the machine moves forward the rotary blades revolve transversely across the furrow or row from right to left, their butt-ends performing the duty of thinning out, the points or slim ends not touching the plants sufficiently to injure the shoots or growth left standing. From the obliquely-twisted form of the blades or thinners and the manner of attaching them to the horizontally-revolving shaft $e\ e\ e$, Fig. 1, the row of cotton is readily operated upon, and the superfluous growth cut out is thrown off to one side of the row, thus dispensing with the ordinary hand-labor necessary heretofore.

Should it be necessary to thin out more or less, this can be done very readily by adjusting or setting the blades closer by the adjusting or regulating screw-tops $c\ c\ c\ c$, Fig. 3. It will be observed by reference to Fig. 2 that the blades or cutters $d\ d\ d\ d$ are formed somewhat in the shape of a scythe-blade, but twisted at the butt-ends, making the blade dished or slightly concave. It will be seen that the arms $b\ b\ b\ b$, Fig. 3, are in direct lines with each other, yet the butt-end of one blade does not come in contact with the point of another blade, and thus it is that a sufficient space or interval is left to admit of the standing plants to pass through between the thinners and remain untouched.

It would be supposed that the transverse revolution of these thinners or cutters would destroy or mash or scrape down entirely the whole row of plants and eradicate every shoot; yet such is not the case, because the space between the butt-end and points of the blades is amply sufficient to admit of the passing of the standing plants.

Should the adjustment of the blades not be sufficient, by the use of the graduating screw-taps $c\ c\ c\ c$, Fig. 3, the point of each blade can be bent inward or closer to the butt-end of the preceding one, the points or narrow ends of the blades being tempered sufficiently soft to admit of the bending in or out, as required, the points being used mainly as gages or regulators, and not as cutters or thinners.

The many advantages over the old, slow, and tedious method of cotton-cultivation presented in my improved implement are as follows:

First, by the aid of my cultivator and one horse, from six to eight times the amount of cultivation can be accomplished, and from six to eight acres per day can be cultivated by one hand.

Secondly, it requires but once going over the row or furrow, instead of having first to cultivate one side at a time and then the other side, which is the case in the old mode.

Thirdly, a quadruple advantage is gained by the cultivation of both sides of the furrow and the thinning out and the throwing off the superfluous plants, this all being accomplished by one person and at one operation.

Fourthly, the cheapness of construction and the greatly-increased yield and improved growth and better quality of the product, all of which I have tested practically during the period of the two past seasons.

The object of the application of the weight $i$ is for the purpose of weighing down the cutters and driving-wheel should it be found requisite, which occurs when the draft of the machine is too light in the cultivation of certain light soils.

Having described the construction, operation, the advantages and utility, of my improved combined cotton cultivator and thinner, what I claim as of my own invention, and desire to secure by Letters Patent of the United States, is as follows:

1. The construction of the accommodating-frame $f\ f\ f\ f\ f$, having uprights $g\ g\ g\ g$, and cross-ties or suspension-bars $h\ h\ h\ h$, together with the compensating-strap or equivalent $p\ p$, Fig. 1.

2. The construction of the twisted obliquely-curved blades or thinners $d\ d\ d$, attached to the radial arms $v\ v\ v$, Fig. 1, forming a rotary cotton-thinner, Fig. 3, and using the same with the right and left double-shank furrow-share, J J K K W, Fig. 1, specifically as set forth, and as arranged with the cultivator, as described.

WHITMAN PRICE.

Witnesses:
C. A. BLACKMON,
WM. T. DORTCH.